United States Patent

[11] 3,613,778

[72] Inventor Karl T. Feldman, Jr.
Albuquerque, N. Mex.
[21] Appl. No. 803,582
[22] Filed Mar. 3, 1969
[45] Patented Oct. 19, 1971
[73] Assignee Northrop Corporation
Beverly Hills, Calif.

[54] FLAT PLATE HEAT PIPE WITH STRUCTURAL WICKS
1 Claim, 2 Drawing Figs.

[52] U.S. Cl. .................................................. 165/105, 317/15, 317/100
[51] Int. Cl. .................................................. F28d 15/00
[50] Field of Search .................................................. 165/105; 317/100, 15

[56] References Cited
UNITED STATES PATENTS

| | | | |
|---|---|---|---|
| 3,018,087 | 1/1962 | Steele | 165/105 |
| 3,152,774 | 10/1964 | Wyatt | 165/105 X |
| 3,243,613 | 3/1966 | Grover | 310/4 |
| 3,429,122 | 2/1969 | Pravda | 165/105 X |
| 3,502,138 | 3/1970 | Shlosinger | 165/105 X |
| 3,532,158 | 10/1970 | Hiebert | 165/105 X |

OTHER REFERENCES

Eastman, GY Heat Pipe Scientific American, May, 1968 pp. 38, 46 (T1. S5)

Feldman, Jr.; KT et al. Heat Pipe Mechanical Engineering, Feb. 1967, pg. 30 (TJ1. A72)

Primary Examiner—Albert W. Davis, Jr.
Attorneys—William W. Rundle and Willard M. Graham ABSTRACT: A heat pipe having a flat plate construction. One wick of screen wire honeycomb is disclosed, and another wick of porous metal layers having grooves therein for vapor flow, these wicks providing a strengthening function.

PATENTED OCT 19 1971

3,613,778

INVENTOR:
Karl F. Feldman Jr.

By William W. Rundle
AGENT

FLAT PLATE HEAT PIPE WITH STRUCTURAL WICKS

The present invention relates to heat pipes, and more particularly, to a flat plate design of heat pipes having improved wicks which provide a load-bearing function.

The heat pipe is a relatively new component originally developed for heat dissipation in power-generation systems for spacecraft. It can have a wide range of industrial applications however. Some of these applications are in cooling electronics systems, rocket motors, airfoils in reentry vehicles, and jet engine elements, for example.

Normally, the heat pipe is a tubular shaped device having a capillary wick covering the inner wall of the cylindrical tube. However, there is no reason why it should be confined to that shape, and a flat plate design would be extremely beneficial. In particular, a flat shape would be desirable as a mounting base for electronic components if an efficient structural arrangement could be found.

It is an object of the present invention to provide a flat plate type of heat pipe of special utility as a heat sink for electrical or electronic components or systems.

A further object is to provide a flat plate heat pipe useful also as a structural load-bearing member.

A more specific object of this invention is to provide a flat plate heat pipe having a wick of improved properties relating to overall system rigidity and light weight.

Briefly, my invention comprises a closed body having a small thickness as compared to its length and width, and a reinforcing inner structure of wick-type material with suitable openings therethrough for rapid distribution of vapor and liquid.

In the accompanying illustrative drawings.

Figure 1:
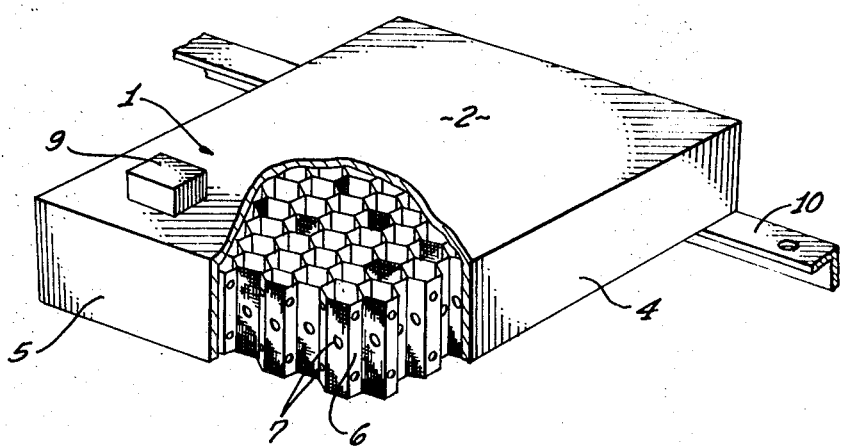
FIG. 1 is a perspective view of a flat plate heat pipe, partially cut away to show the internal wick structure.

Referring first to FIG. 1, a heat pipe according to one form of the present invention is shown. It is comprised of a closed vessel 1 having a flat top 2, bottom (not shown), two sides 4, and two ends 5 of metal, for example. It has a capillary wick 6 in the form of a honeycomb cell structure substantially filling the vessel 1. It is preferably formed of sintered screen wire of the same metal as the vessel 1, and is preferably bonded to all the inner surfaces of the vessel by brazing, fusing, or the like. Conventional honeycomb techniques can be used to fabricate and assemble the wick and surface plates.

Wick 6 is perforated by holes 7 in the cell walls throughout the wick 6, for the purpose of rapid passage of vapor from a heated region to an oppositely located heat rejection area.

The vessel 1 is evacuated of air, and a suitable liquid is added to the sealed interior to saturate the wick 6. Such liquid may be water, ammonia, acetone, methyl alcohol, or other fluids and molten materials, the same as in any conventional heat pipe.

In such a heat pipe as in FIG. 1, the best heat flow is in the bottom to top direction, or top to bottom. However, a particular use of this flat heat pipe is for mounting or otherwise fixing heat-generating electronics to the large top surface 2, such as the electronic component 9 shown in FIG. 1. For this case, the intended direction of heat flow is from side to side or end to end, with the top 2 and bottom occupying a normally vertical position. As shown in FIG. 1, the heat rejection end of the heat pipe is attached to supporting structure 10 which is a good heat conductor.

Figure 2:
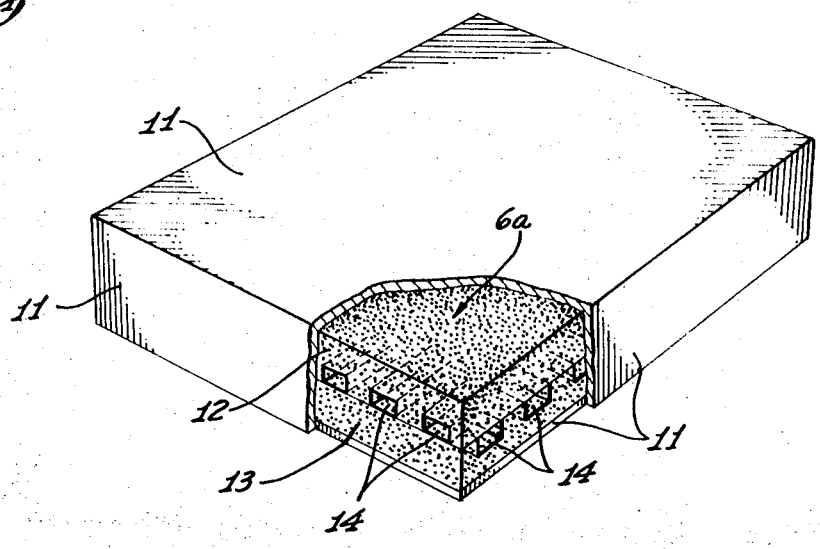
FIG. 2 is a perspective cut-away view of a similar heat pipe, showing a different wick construction.

Another embodiment of a structural wick is shown in FIG. 2. Here, the outer surfaces 11 can remain the same as in FIG. 1, but the wick 6a comprises two layers 12 and 13 of a porous metallic structure. One example would be felt metal such as is made from metal chips and fibers by pressure and heat. Another would be layers of woven screen wire stacked one on top of another and sintered together for strength. To secure rapid travel of a fluid vapor throughout the heat pipe, each layer 12 and 13 is provided with open grooves 14 in one facing surface, and the layers are assembled so that the grooved surfaces face each other with the grooves in one layer extending perpendicular to those in the other layer.

The heat pipe of FIG. 2 uses a fluid the same as that of FIG. 1, of course. The choice of fluid is governed by the required operating temperature of the heat pipe.

It is thus seen that the present invention provides a flat plate heat pipe which extends the usefulness of a heat pipe to many more applications. As mentioned earlier, such a flat heat pipe is ideal for cooling electronics mounted on its surface, where one portion of the plate absorbs heat and another portion rejects heat, as an isothermal fin. This heat pipe can be flat or curved, parallel surfaced or wedge shape, and need not be limited to a rectangular shape.

An important feature of this invention is the load bearing nature of the wick. That is, the heat pipe can function as a structural member and be incorporated as such in aircraft, spacecraft, and the like, where high heat transfer and light weight are both required.

Although metal has been preferred in this specification for the body portion, outer surfaces could be of an optional material if desired or necessary, such as fiber glass, nylon, or other plastic. The heat transfer would be degraded, however, from that of heat pipes using nothing but high heat-conductive metals.

While in order to comply with the statute, the invention has been described in language more or less specific as to structural features, it is to be understood that the invention is not limited to the specific features shown, but that the means and construction herein disclosed comprise the preferred form of putting the invention into effect, and the invention is therefore claimed in any of its forms or modifications within the legitimate and valid scope of the appended claims.

I claim:

1. A flat plate heat pipe comprising a generally parallel top and bottom surface, said top and bottom being sealed at the edges thereof to form a sealed closure, wick means substantially filling said closure and comprised of a porous capillary material, said closure being evacuated of air and containing sufficient working liquid to substantially saturate said wick, said wick means comprising at least two layers of wick material, the facing surfaces of said layers having a plurality of grooves extending in respective perpendicular directions from end to end and side to side of said heat pipe.